(12) United States Patent
Annampedu et al.

(10) Patent No.: US 7,092,462 B2
(45) Date of Patent: Aug. 15, 2006

(54) ASYNCHRONOUS SERVO RRO DETECTION EMPLOYING INTERPOLATION

(75) Inventors: Viswanath Annampedu, Schnecksville, PA (US); Pervez M. Aziz, Garland, TX (US)

(73) Assignee: Agere Systems Inc., Allentown, PA (US)

( * ) Notice: Subject to any disclaimer, the term of this patent is extended or adjusted under 35 U.S.C. 154(b) by 255 days.

(21) Appl. No.: 10/342,153

(22) Filed: Jan. 14, 2003

(65) Prior Publication Data
US 2004/0136477 A1    Jul. 15, 2004

(51) Int. Cl.
H03D 1/00 (2006.01)
H04L 27/06 (2006.01)

(52) U.S. Cl. .................. 375/340; 375/290; 360/32; 360/61

(58) Field of Classification Search ............ 375/290, 375/285, 316, 350, 340–342; 360/32, 39, 360/55, 61
See application file for complete search history.

(56) References Cited

U.S. PATENT DOCUMENTS 6,028,727 A * 2/2000 Vishakhadatta et al. ...... 360/51
6,834,035 B1 * 12/2004 Marukawa et al. ...... 369/59.22

* cited by examiner

Primary Examiner—Jean B. Corrielus

(57) ABSTRACT

A repeatable read-out (RRO) detector employs one or more digital interpolators to interpolate asynchronous sample values that represent RRO data. The asynchronous sample values are read from a recording medium and generated by an A/D converter at a symbol rate, and the interpolators generate interpolated samples at at least one time in between the asynchronous sample value times. Each interpolated sample corresponding to some phase relative to that of the sample values generated by the A/D converter. The RRO detector receives 1) the asynchronous samples at symbol rate and 2) the interpolated samples to efficiently detect the encoded RRO data. An RRO address mark indicates when detection of encoded RRO data starts, and is employed to select those samples suitable for RRO data detection. Detection of the RRO address mark employs peak detection among filtered asynchronous and interpolated samples. The process of peak detection adjusts the current best phase for sample selection. When the RRO address mark is found, the corresponding best phase corresponds to either asynchronous sampled values or interpolated samples that are subsequently selected for RRO data detection, termed best samples. Once the best phase is selected, the RRO data detector uses that information along with RRO encoding constraints to decode the encoded RRO data from the best samples.

21 Claims, 10 Drawing Sheets

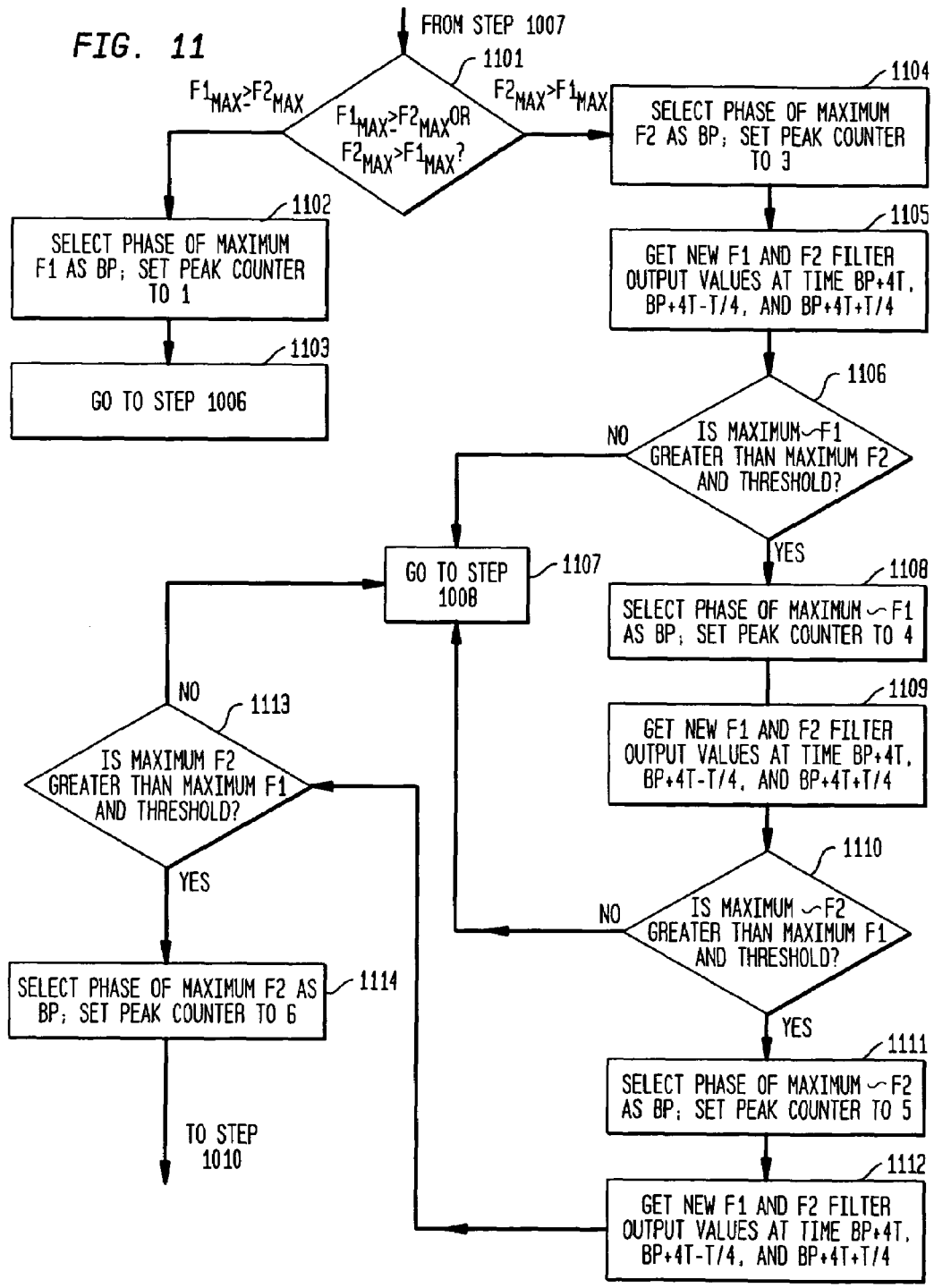

_ASYNCHRONOUS SERVO RRO DETECTION EMPLOYING INTERPOLATION_

BACKGROUND OF THE INVENTION

1. Field of the Invention

The present invention relates to detection of data in a communications system, and, more particularly, to detection of servo repeatable run out (RRO) information from a channel.

2. Description of the Related Art

A Read channel integrated circuit (IC) is a component of a modern hard disk drive, such as a hard disk drive found in many PCs. A Read channel component converts and encodes data to enable the (e.g., magnetic) recording head(s) to write data to the disk drive and then read back the data accurately. The disks in a drive typically include many tracks containing encoded data, and each track comprises one or more of user (or "read") data sectors as well as "servo" data sectors embedded between the read sectors. The information of the servo sectors aids in positioning the magnetic recording head on track so that the information stored in the read sectors may be retrieved accurately.

Repeatable run out (RRO) refers to a phenomenon that occurs due to imperfect spindles. Imperfect spindles might not allow the disk in the hard drive to spin properly at the disk's center. If the disk is not rotating at the center, the track rotating under the head does not follow a circular trajectory, and hence the head might not be able to read the servo information properly. A similar phenomenon occurs when spindle imperfections were present at the time the servo information was written to the disk. Even though the disk may spin properly in a different hard disk drive while reading the servo information, since the information was not written properly on a circular track, the head might not be able to read the servo information accurately. Thus, there is a need for a mechanism to properly guide the head to follow the trajectory of the track. A RRO data field in the servo information serves this purpose.

FIGS. 1A–1D illustrate one form of RRO (termed a one "f" run out) that results from an imperfect spindle. FIG. 1A shows radial position versus error when the error is zero, corresponding to the head tracking in a circular trajectory. FIG. 1B shows the head tracking a circular trajectory shown by the dashed circle 102 on disk 103. As shown in FIG. 1C, the error for one "f" run out varies as a function of the radial position, but the error at a given position repeats after one revolution of the disk. As shown in FIG. 1D, the head may track an oval path shown by the dashed path 104 on disk 103. Since the error "repeats" itself from one revolution to another, techniques may be devised to compensate for the problem. By feeding positioning information about the "repeatable" error to servo control circuitry, the error may be corrected to position the head properly over the servo track. State of the art magnetic recording systems employ digital signal processing to detect servo data as opposed to older systems employing analog techniques.

FIG. 2 shows a conventional magnetic recording system of the prior art. Servo data is encoded by block encoders 201. Block encoders 201 may represent several different encoders associated with different fields of the servo data. The encoded servo information is written to the disk (or other recording medium) as servo sector information.

FIG. 3 shows the format of servo sector information 300. The servo sector information 300 comprises preamble 301 (e.g., a 2T pattern) that allows the system to recover the timing and gain of the written servo data. Preamble 301 may be followed by encoded servo address mark (SAM) 302 that is an identical identification address (fixed number of bits) for all servo sectors. SAM 302 may then be followed by encoded Gray data 303. Gray data 303 represents track number/cylinder information and may be employed as coarse positioning information for the magnetic head. Gray data 303 is followed by one or more burst demodulation fields 304. Burst demodulation fields 304 are employed as fine positioning information for the head over the track. Burst demodulation fields 304 are followed by RRO data field 305. Information in RRO data field 305 provides head positioning information to correct for RRO, which information is finer than that provided by Gray data and coarser than that provided by the burst demodulation fields.

The format of RRO data field 305 is shown in FIG. 4. RRO data field 305 begins with DC erase 401, which may be any predetermined pattern, but is typically either an all zeros or ones pattern. DC erase 401 is followed by RRO address mark (AM) 402, which is a bit pattern that is the same for all servo sectors. RRO address mark 402 indicates when to start decoding RRO data and aids selection of the best sampling phase for decoding RRO data 403. RRO address mark 402 is followed RRO data 403, which includes head-positioning information. RRO data 403 is followed by parity field 404, which includes parity bits employed for error detection/correction. Parity field 404 is followed by toggle bit 405, which brings the magnetization level to whatever the disk used in DC erase 401.

The servo preamble, SAM, Gray data, and burst demodulation fields are typically written by a servo track writer. However, the RRO data field following the last demodulation field is typically written by the Read channel component. For detecting the servo preamble, SAM, Gray data, and demodulation fields, a digital phase-locked loop (DPLL) acquires proper sampling phase based on the timing information provided by the preamble. However, for RRO detection, it is desirable not to write a preamble for format efficiency reasons. Hence, a detector does not know a priori the proper sampling phase (timing) to read the RRO information. Thus, reading RRO information is an "asynchronous" data detection process. Also, detection of the RRO address mark is prone to detection errors because the RRO detector may begin detection in the DC erase field without proper sampling phase (i.e., there is no preamble to guide the timing loop). The number of detection errors increases when fewer bits are written as the RRO address mark for format efficiency reasons.

Returning to FIG. 2, the encoded servo information is read back by a magnetic recording head. Together, the process of writing to, storing on, and reading from disk by the recording head may be modeled as magnetic recording channel 202. Data read from the disk is referred to as readback data. The readback data is equalized to a desired target partial response by equalizer 203 comprising continuous time filter (CTF) 220 followed by discrete time finite impulse response (FIR) filter 221. Sampling of the signal from CTF 220 (shown in FIG. 2 by switch 222) is synchronous using the timing information from a DPLL (digital phase-locked loop, not shown in FIG. 2) when servo Gray and demodulation burst data are read, but is asynchronous when RRO data is read. The output of equalizer 203 is digitized and quantized by A/D converter 204, whose output is shown as 'Y' values.

The Y values are applied to Viterbi detector 205, which is a partial-response maximum-likelihood (PRML) detector. Constraints imposed by the servo encoder of block encoder 201 may be employed in the design of the Viterbi detector to detect the servo data optimally. The output of Viterbi detector 205 is applied to block decoder 207 to generate decoded SAM and Gray data. The output of Viterbi detector 205 (which is pruned to enforce the RRO encoder coding constraints) is also applied to RRO detector 208. RRO detector 208 includes RRO address mark (AM) & middle phase detector 209 which detects the RRO address mark and simultaneously detects the best phase (BP) (corresponding to the middle bit of the RRO codeword). RRO data detector 210 of RRO detector 208 employs the RRO AM and BP to select samples to decode into RRO data. The 'Y' values are also passed on to burst demodulator 206 to generate fine positioning information for the head over the track.

Other detectors employed for detection of servo information include peak detectors. In peak detectors, location and polarity of the peak (which are dependent on servo encoder constraints) serve to enable decoding of the data. The output of the peak detector may also be fed to an RRO detector for detecting the RRO information. Both peak and Viterbi detectors give very good performance when they use properly sampled signals for detecting the bits. The performance of these detectors degrades significantly when the samples are generated with timing errors.

An RRO encoder (such as included in block encoders 201) transforms each one-bit value of the RRO data into 3 bit values by repeating the one-bit value three times (i.e., "1" goes to "111" and "0" goes to "000"). If the constraint that no two transitions are adjacent is imposed on detection of encoded RRO data (termed a d=1 constraint and often employed for non-return to zero (NRZ) line coding), the trellis employed by the Viterbi detector is pruned to enforce this constraint (i.e., the constraint that neither "010" nor "101" bit patterns are allowed within the output bit stream of the Viterbi detector). Enforcing the d=1 constraint in a 16-state Viterbi detector defines the invalid states for d=1 constraint as 0010, 0100, 0101, 1101, 1011, 1010. The valid states for d=1 constraint are 0000, 0001, 0011, 0110, 0111, 1111, 1110, 1100, 1001, and 1000.

FIG. 5 shows pruning of the trellis of the Viterbi detector with the d=1 constraint. The left column represents the 16 possible states at time [n-1], and the right column represents the 16 possible states at time [n]. The bit-pattern in each state represents the four bits currently in the detector, with the least significant bit (LSB) representing the most recently received bit (i.e., the LSB of a state at time [n-1] is $Y_{[n-1]}$). Thus, a single bit cycle is shown. In general, transitions from invalid states in the left column are pruned (have no transitions) to the right column, with the exception of states 2 (0010) and 13 (1101) whose transitions enable each state to be reached by at least one path. For these exceptions, the transitions are to invalid states that are pruned in the next cycle. Valid states having a pruned path are indicated by heavy solid lines, with the path from the valid to invalid state being pruned. Other valid states in the left column may permit transitions to invalid states in the right column to enable each state to be reached by at least one path. The transitions to invalid states are then pruned in the next cycle.

Since the sampling phase is not known when reading the RRO data field, a Viterbi detector is more prone to making errors. Due to the imposed d=1 constraint, only certain type of errors are possible. Since each bit is written thrice and because of the d=1 constraint in the Viterbi detector, the first and third bits are most likely to be affected, while the second (middle) bit is most likely to be preserved due to improper sampling phase. For example, an encoded user data stream of . . . 111 000 111 000 000 . . . input to the d=1 constraint pruned Viterbi detector is output as . . . 011 100 111 100 000 . . . (using the pruned 16-state trellis of FIG. 5). Identifying the middle bit detects the corresponding RRO data field. The RRO address mark is employed to identify which bits of the Viterbi detector output are the middle bits.

One technique of the prior art to identify middle bits employs middle phase selection logic. For example, if 0101001 is the pattern used for RRO address mark, after encoding, this pattern becomes 000111000111000000111 (which is 21 bits). RRO sync and phase centering by detector 209 are accomplished by passing the data from the output of the pruned Viterbi detector through a sliding window. The data within the window is compared to the expected address mark for each phase of the bit (3T/bit, where T is the bit period). The RRO address mark is found when the number of mismatches is less than a threshold (or equivalently, the number of matching bits is greater than or equal to a threshold). For example, if no tolerance is allowed for errors in the read RRO address mark, all 7 bits of the RRO address mark must match and the threshold for the number of matching bits is set as 7. Phase centering (selecting which is the middle bit) is accomplished by evaluating the number of matches on adjacent phases.

FIG. 6 illustrates one technique of phase centering of the prior art. Data C is a bit stream output from the Viterbi detector. If "0101001" is the pattern used for RRO address mark, then, after encoding, this pattern becomes 000111000111000000111, shown as the Data C bit stream. The Data B and Data A bit streams are the Data C bit stream delayed, in time, by one and two bit periods (T), respectively. The bit streams are passed through a sliding window 601 and compared to the expected RRO address mark value. The sliding window effectively produces the following operations at every bit period T: A=B, B=C, and C gets next bit from the Viterbi detector. The RRO address mark value is found when the number of mismatches is less than a threshold, or, equivalently, the number of matches is greater than or equal to a threshold. For the example of FIG. 6, a threshold of 7 for the number of matching bits would require that no mismatches exist. Phase centering (detecting the middle-encoded bit) is accomplished by counting the number of matches in the adjacent phases.

SUMMARY OF THE INVENTION

The present invention relates to repeatable read out (RRO) data detection employing at least one interpolation of asynchronous samples at a symbol rate to one or more interpolated samples. The interpolated samples occur at at least one time in between pairs of adjacent symbol times. Each interpolation generates an interpolated sample at a phase relative to that of the asynchronous samples. An RRO address mark indicates when detection of RRO data starts, and is employed to select those samples suitable for encoded RRO data detection. Detection of the RRO address mark employs peak detection among filtered asynchronous and interpolated samples. The process of peak detection adjusts the current best phase for sample selection. When the RRO address mark is found, the corresponding best phase corresponds to either asynchronous sampled values or interpolated samples that are subsequently selected for RRO data detection, termed best samples. Once the RRO address mark is detected and the best phase selected, RRO data detection may employ RRO encoding constraints to decode the RRO data.

In accordance with one embodiment of the present invention, data in samples read from a recording channel are detected by generating one or more interpolated samples from sets of read samples, wherein each interpolated sample has a corresponding phase relative to one of the associated set of read samples; and filtering, with at least one corresponding filter, either i) a read sample or ii) an interpolated sample at a given phase to generate an output value, wherein each filter has a filter response based on a target partial response of the recording channel. One or more peaks are detected within the filter output values, wherein each peak is based on values of the data corresponding to the filtered sample, and, as each peak is detected, a best phase value is adjusted based on the given phase of the sample corresponding to the peak filter output value. When a predetermined number of peaks are found, the best phase value is provided to select either read samples or interpolated samples for data detection.

BRIEF DESCRIPTION OF THE DRAWINGS

Other aspects, features, and advantages of the present invention will become more fully apparent from the following detailed description, the appended claims, and the accompanying drawings in which:

FIG. 11 shows a method of testing for each peak in step 1009 of FIG. 10.

DETAILED DESCRIPTION

Figure 1A:
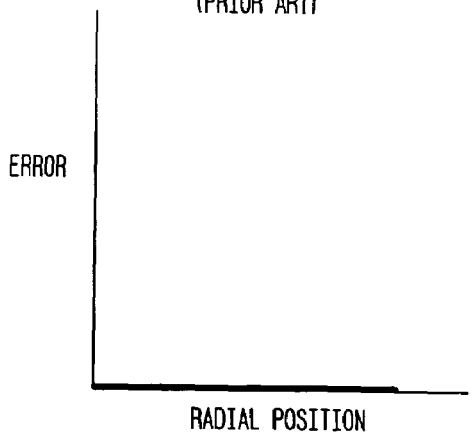
FIG. 1A shows radial position versus error of a head following a trajectory over a rotating disk when the error is zero.
Figure 1B:
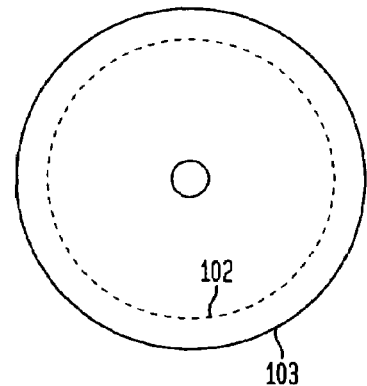
FIG. 1B shows the head tracking a circular trajectory for the graph of FIG. 1A.
Figure 1C:
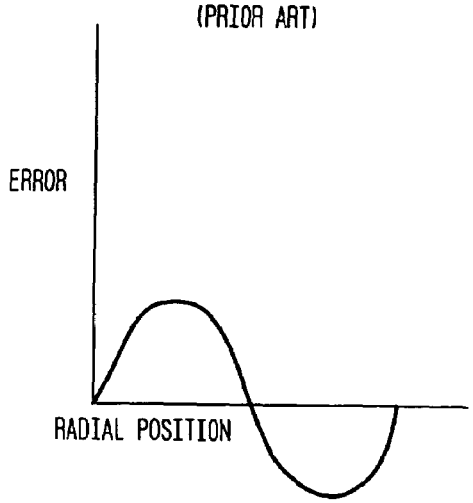
FIG. 1C shows radial position versus error of a head following a trajectory over a rotating disk for varying error that returns to zero after one revolution of the disk.
Figure 1D:
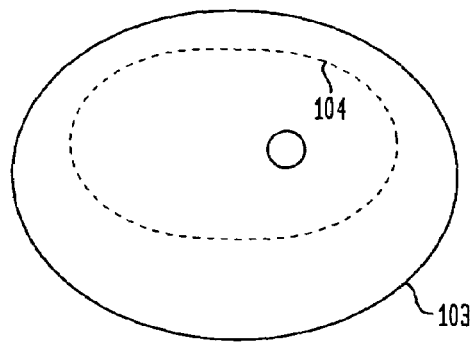
FIG. 1D shows a head tracking an oval path for the graph of FIG. 1C.
Figure 2:
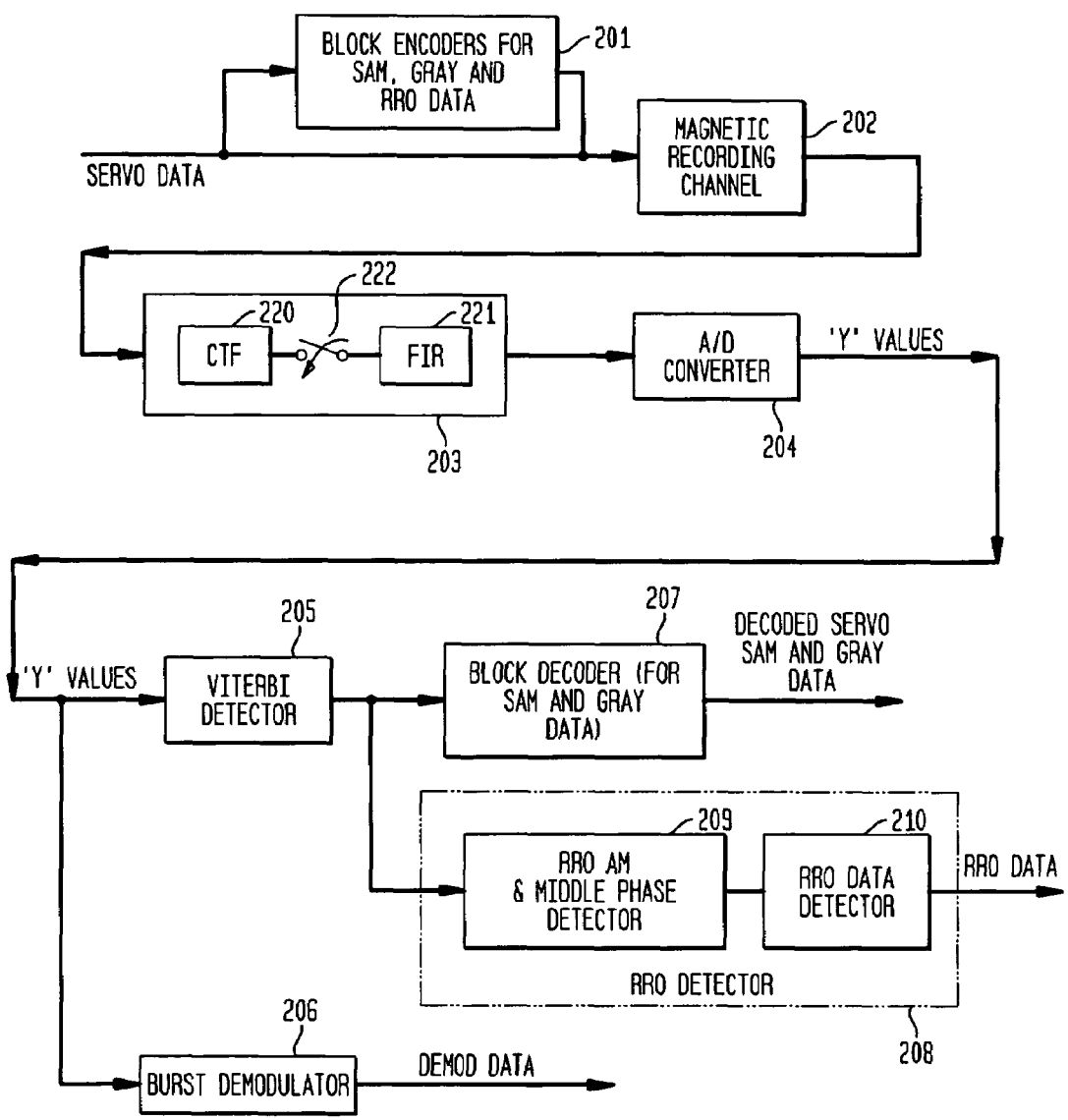
FIG. 2 shows a conventional magnetic recording system of the prior art.
Figure 3:
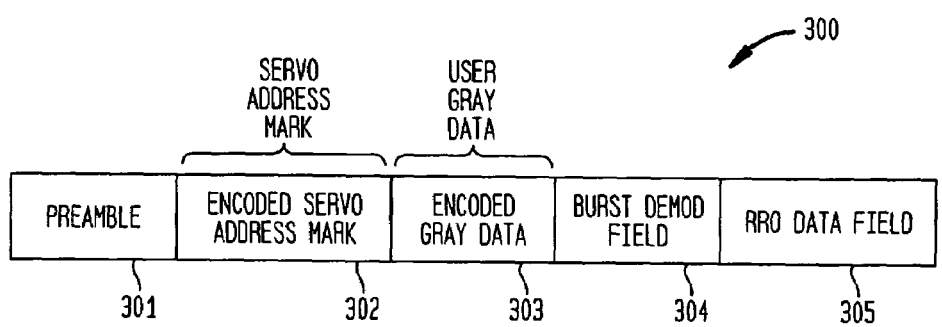
FIG. 3 shows a format for servo sector information employed with the magnetic recording system of FIG. 2.
Figure 4:
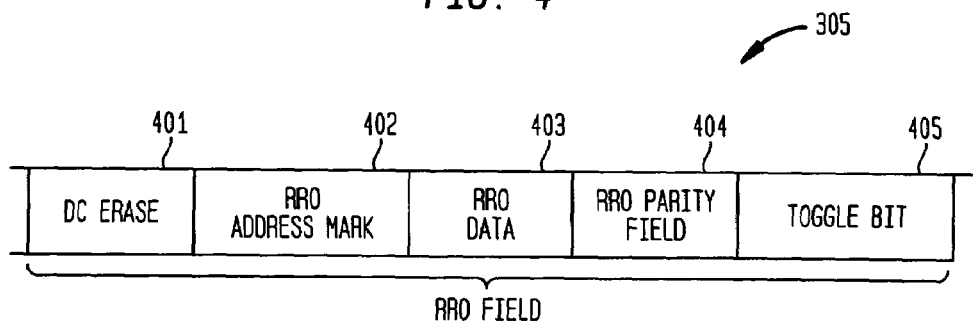
FIG. 4 shows the format of the repeatable run out data field of FIG. 3.
Figure 5:
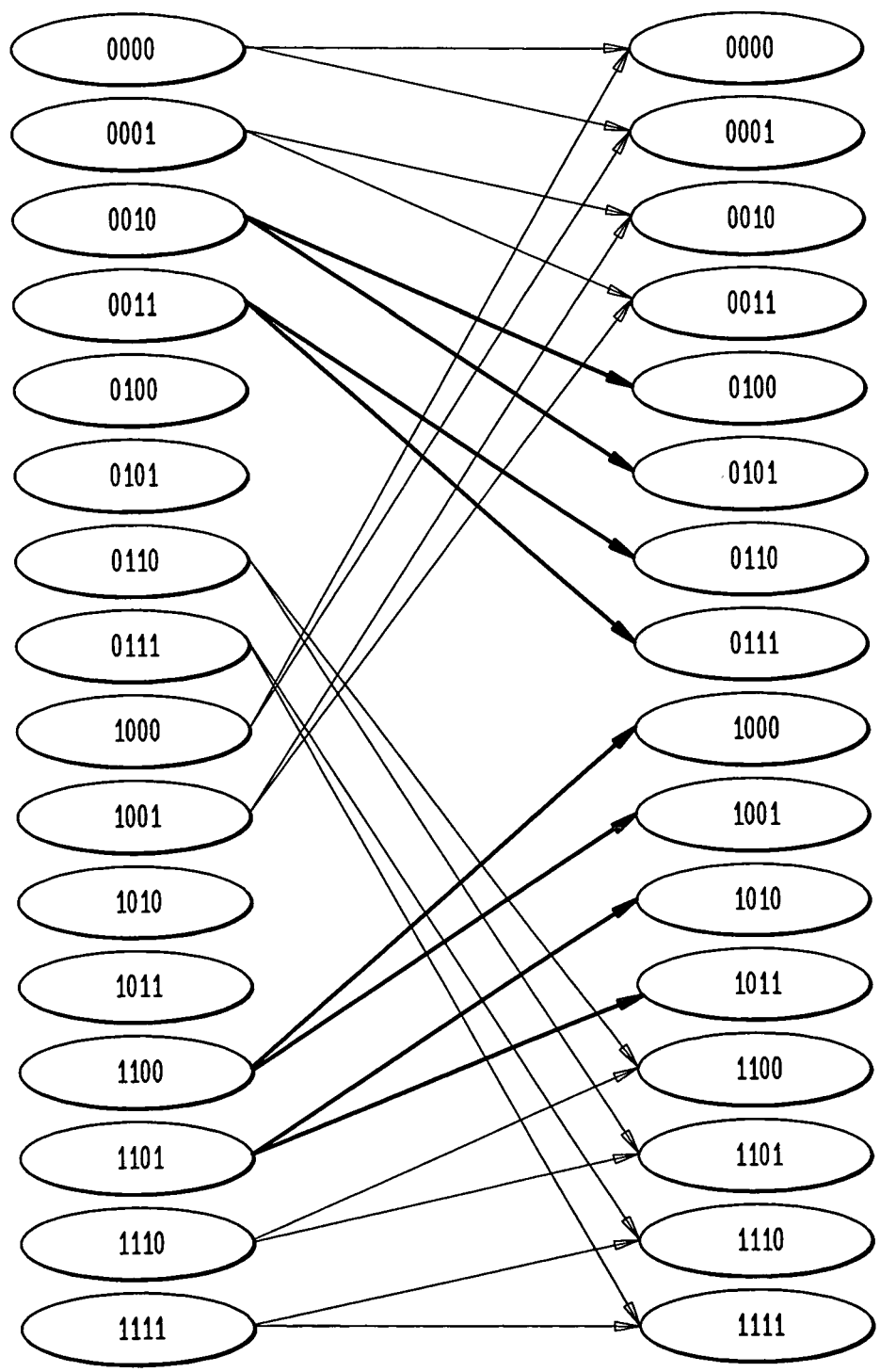
FIG. 5 shows a pruned trellis of the Viterbi detector of FIG. 2 to impose a d=1 constraint.
Figure 6:
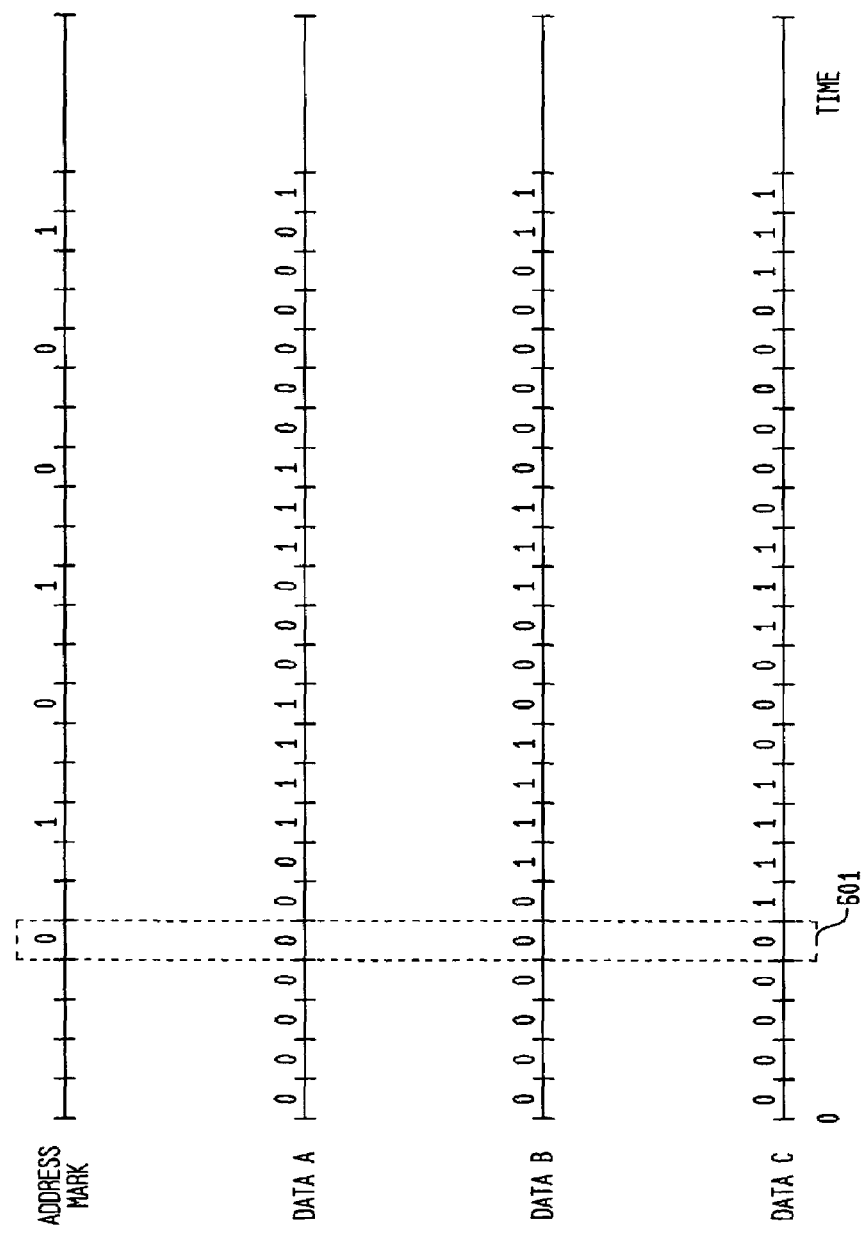
FIG. 6 illustrates setting a best phase based on the middle bit of the prior art.
Figure 7:
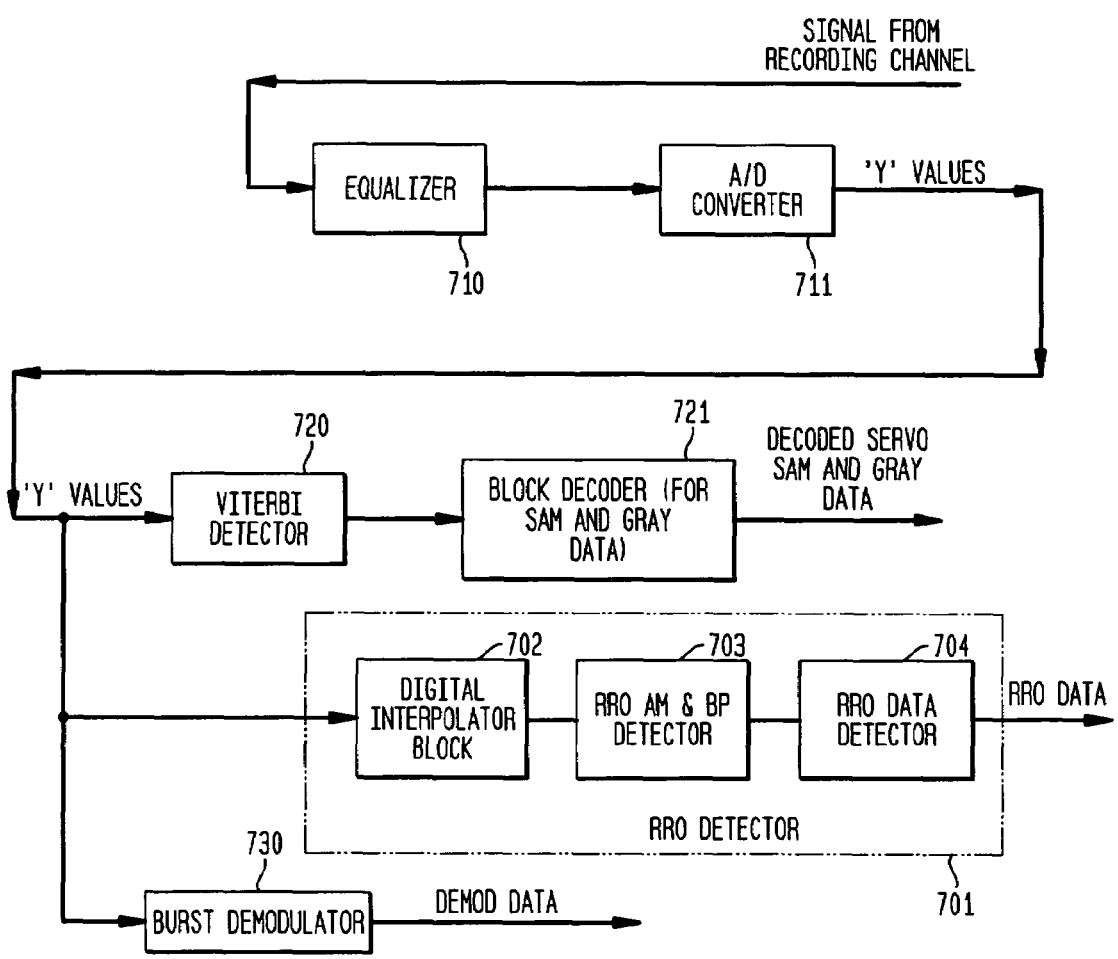
FIG. 7 shows a receiver including a repeatable run out detector for detecting and decoding data in accordance with exemplary embodiments of the present invention.

FIG. 7 shows a receiver 700 including a repeatable run out (RRO) detector 701 for detecting and decoding RRO data in accordance with exemplary embodiments of the present invention. Receiver 700 comprises equalizer 710 and A/D converter 711. Equalizer 710 applies equalization to a signal read from a magnetic recording medium, such as a magnetic recording disk, to compensate for effects of inter-symbol interference (ISI) and signal dispersion caused by the signal's passage through the magnetic recording medium. The analog signal may represent a series of symbols for servo data, such as encoded SAM, Gray, and RRO data as shown in FIGS. 3 and 4. Equalizer 710 may include a switch to enable sampling of the analog signal. A/D converter 711 generates digital samples at a symbol rate T from the equalized signal from equalizer 710. Sampling of the signal from equalizer 710 may be synchronous using the timing information from a digital phase-locked loop (DPLL, not shown in FIG. 7) when servo SAM, Gray, and demodulation burst data are read, but is asynchronous when RRO data is read. The output of A/D converter 711 is shown as 'Y' values.

Receiver 700 may further comprise Viterbi detector 720, block decoder 721, and burst demodulator 730. Viterbi detector 720 may be employed to detect the symbol sequence representing the encoded servo SAM and Gray data. Block decoder 721 may comprise SAM and Gray data decoding logic to generate the decoded SAM and Gray data from the detected symbol sequence from Viterbi detector 720. Similarly, burst demodulator 730 is employed by receiver 700 to detect burst demodulation data. While FIG. 7 shows a Viterbi detector, one skilled in the art may employ other types of detection, such as peak detection, to detect the symbol sequence from the received signal 'Y' values.

While the present invention is described for detection and decoding of encoded RRO data from a magnetic recording medium, the present invention is not so limited. One skilled in the art may readily extend the teachings herein to sampled data read from other types of recording media, such as optical recording media. In addition, while the following exemplary embodiments are described for asynchronously sampled servo RRO data detection, the techniques described herein may be employed for synchronously sampled servo RRO data detection as well.

RRO detector 701 comprises digital interpolator block 702, RRO address mark (AM) & best phase (BP) detector 703, and RRO data detector 704. The 'Y' values from A/D converter 711 are applied to RRO detector 701 and represent asynchronous sample values having an arbitrary phase for the RRO data. Digital interpolator block 702 may comprise one or more digital interpolators, each interpolator interpolating the 'Y' values from A/D converter 711. RRO AM&BP detector 703 selects a best phase of the combined stream of asynchronous sample values and interpolated samples while detecting an RRO address mark. The selected best phase represents the timing for a subset of samples from the combined stream, termed "best" samples that are applied to RRO data detector 704. Best samples may be, for the example of 1-to-3 bit encoding, samples corresponding to the middle bit that will exhibit the least number of detection errors. Based on a priori information about the RRO encoder's coding constraints, RRO data detector 704 decodes the best samples into RRO data. Operation of digital interpolator block 702, RRO AM&BP detector 703, and RRO data detector 704 in accordance with exemplary embodiments of the present invention is now described.

Digital interpolator block 702 receives, for example, four 'Y' values Y0, Y1, Y2, and Y3, which values are asynchronous samples from A/D converter 711 sampled at the symbol rate T. These samples may be any samples that are T apart in time. Using these four asynchronous samples, digital interpolator block 702 generates estimates for interpolated samples (e.g., Y11, Y12 and Y13). For example, the following filtering operations of equations (1) through (3) generate interpolated samples Y11, Y12, and Y13:

$$Y11=(-2*Y3+5*Y2+13*Y1-2*Y0)/16 \quad (1)$$

$$Y12=(-2*Y3+9*Y2+9*Y1-2*Y0)/16 \quad (2)$$

$$Y13=(-2*Y3+13*Y2+5*Y1-2*Y0)/16 \quad (3)$$

Each of the filter operations represented by equations (1) through (3) is a digital interpolation. The term "16" in the denominator of equations (1)–(3) is a gain term employed to adjust the interpolated samples values to be compatible with sample values from the A/D converter. Compatible samples should resemble samples of an oversampled signal passed to the A/D converter. Other embodiments may scale the original read samples (i.e., the denominator of equations (1)–(3) becomes "4", and samples Y0, Y1, Y2, and Y3 are scaled by multiplying by 4). Digital interpolator block 702 may comprise one digital interpolation filter for each of the sampling points to be interpolated (i.e., one interpolator per equation), though separate serial processing may also be employed. The present invention is not limited to these forms of filtering operations described in equations (1)–(3), and one skilled in the art may employ other types of interpolation to generate interpolated samples.

Figure 8:
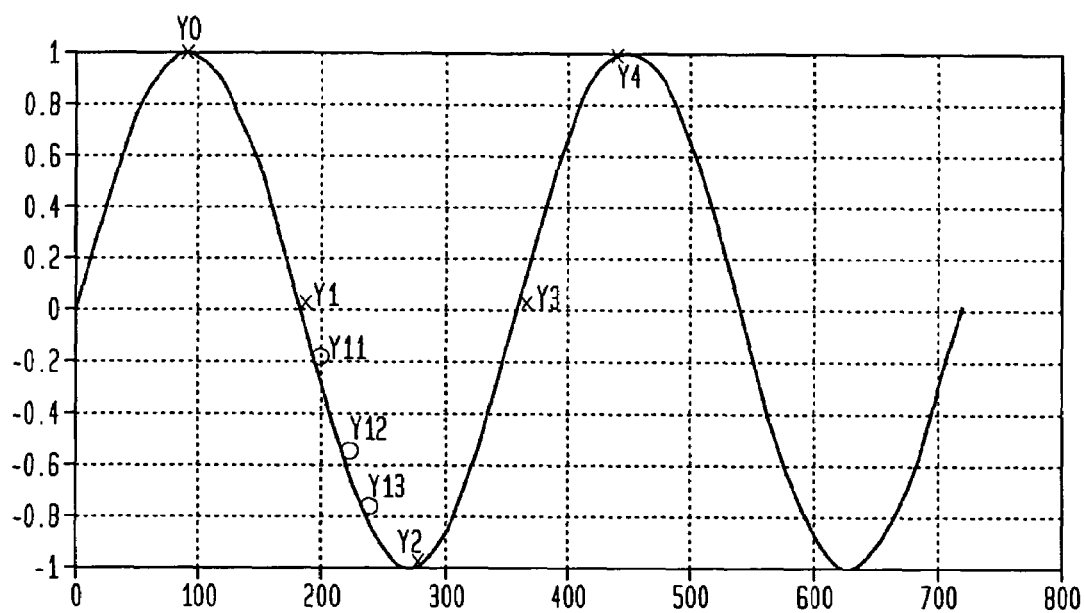
FIG. 8 shows a graph of a waveform including asynchronous sample points and interpolated sample points.

Interpolated sample Y11 corresponds to a sample that is spaced T/4 after the asynchronous sample Y1. Similarly, interpolated samples Y12 and Y13 are spaced T/2 and 3T/4 apart from Y1, respectively. Thus, if sample Y1 corresponds to a time kT, then sample Y11 corresponds to Y1(kT+T/4), sample Y12 corresponds to Y1(kT+T/2), sample Y13 corresponds to Y1 (kT+3T/4), and sample Y2 corresponds to Y1(kT+T). FIG. 8 shows a graph of a waveform including asynchronous sample points and interpolated sample points Y1, Y11, Y12, Y13, and Y2. After accounting for inherent filter and implementation delays, digital interpolator block 702 generates a continuous stream of samples, which are T/4 apart from each other. Alternatively, over-sampling may be employed to generate a similar continuous stream of samples, but requires increasing the clock of A/D converter 711 by a factor of four.

The present invention is not limited to samples spaced T/4 apart, and additional interpolators may be employed to estimate sample points at other sampling instances. For example, to estimate samples with a T/8 resolution (i.e., spacing between two samples is T/8), seven interpolators are employed to generate interpolated samples used in addition to the asynchronous samples from A/D converter 711. Filter coefficients for these seven digital interpolators are given in Table 2 below:

TABLE 2

| Interpolation at | Simple Digital Filters (Number of Taps: 4) | | | |
|---|---|---|---|---|
| T/8 | −1/16 | 2/16 | 15/16 | −1/16 |
| T/4 | −2/16 | 5/16 | 13/16 | −2/16 |
| 3T/8 | −2/16 | 7/16 | 11/16 | −2/16 |
| T/2 | −2/16 | 9/16 | 9/16 | −2/16 |
| 5T/8 | −2/16 | 11/16 | 7/16 | −2/16 |
| 3T/4 | −2/16 | 13/16 | 5/16 | −2/16 |
| 7T/8 | −1/16 | 15/16 | 2/16 | −1/16 |

Operation of RRO AM&BP detector 703 is now described given samples spaced T/4 apart, although the method presented below may be modified for 1) any number of interpolators, 2) any RRO address mark pattern containing positive and negative peaks (e.g., a pattern with transitions), and 3) any target partial response for the recording channel.

The RRO address mark 402 (FIG. 4) indicates (i) when to start detecting the RRO data and (ii) best phase selection (one of the 4 phases for the samples spaced T/4 apart). Best phase selection is the process of selecting the samples from one of the interpolators of digital interpolator block 702 or the Y values (e.g., the output of i) one of the three interpolators in digital interpolator block 702 or ii) the output of A/D converter 711) as the source of samples for RRO data detection. For the exemplary embodiment described below, the example RRO address mark pattern (after the DC erase field) might be: 0 0 1 1 0 0 1 1 1 1 0 0 1 1 0 0 0 0 1 1 1 1 0 0. In addition, the target partial response of the recording channel is EPR4 ([5 5 −5 −5]).

Figure 9:
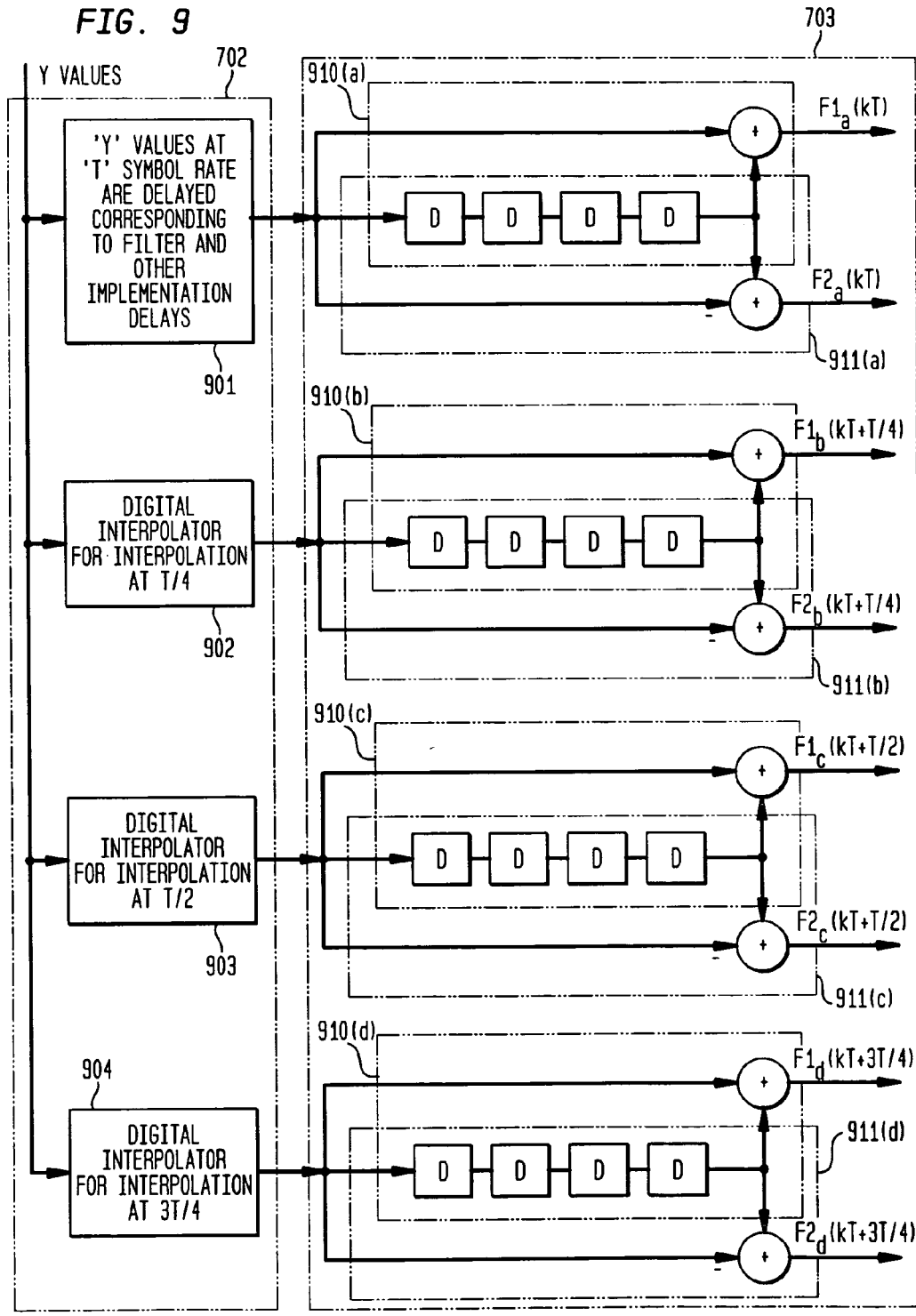
FIG. 9 is a block diagram showing interpolation by the digital interpolator and filtering by the repeatable run out address mark and best phase detector of FIG. 7.

FIG. 9 is a block diagram showing interpolation by digital interpolator block 702 and filtering by RRO AM&BP detector 703. Y values are applied to digital interpolator block 702. The Y values correspond to the example RRO address mark pattern, and the Y values are asynchronous samples at the symbol rate T with a sampling phase error from A/D converter 711. Digital interpolator block 702 includes register 901 for storing the sequence of Y values Y(kT), and interpolators 902, 903, and 904 for generating interpolated samples Y(kT+T/4), Y(kT+T/2), and Y(kT+3T/4), respectively. The four sample streams are then provided to RRO AM&BP detector 703. Each of these four sample streams from register 901 and interpolators 902, 903, and 904 is passed through a corresponding pair of digital filters 910(a) and 911(a), 910(b) and 911(b), 910(c) and 911(c), and 910(d) and 911(d), respectively. Digital filters 910(a)–910(d) have filter response $(1+D^4)$, and digital filters 911(a)–911(d) have filter response $(-1+D^4)$, where "D" represents the unit discrete delay operator. The filter outputs of digital filters 910(a) . . . 910 (d) are denoted by $F1_a(\bullet)$ . . . $F1_d(\bullet)$, and the filter outputs of digital filters 911(a) . . . 911(d) are denoted $F2_a(\bullet)$ . . . $F2_d(\bullet)$.

Table 3 gives relatively ideal Y values with corresponding F1 and F2 filter outputs at peak values for an EPR4 channel response (i.e., EPR4 ([5 5 −5 −5])), where each bit (row) is spaced T apart in time.

TABLE 3

| Bits | Ideal Y | F1: 1 + $D^4$ | F2: −1 + $D^4$ |
|---|---|---|---|
| 0 | | | |
| 0 | | | |
| 1 | | | |
| 1 | 20 | 20 | −20 |
| 0 | | | |
| 0 | | | |
| 1 | | | |
| 1 | 20 | 40 | 0 |
| 1 | | | |
| 1 | | | |
| 0 | | | |
| 0 | −20 | 0 | 40 |
| 1 | | | |
| 1 | | | |
| 0 | | | |
| 0 | −20 | −40 | 0 |
| 0 | | | |
| 0 | | | |
| 1 | | | |
| 1 | 20 | 0 | −40 |
| 1 | | | |
| 1 | | | |
| 0 | | | |
| 0 | −20 | 0 | 40 |

As shown in Table 3, peaks of a specific polarity occur at expected time instants 4T apart (for the example case where encoding yields peaks 4T apart) in one of the pairs of digital filters 910(*a*) and 911(*a*), 910(*b*) and 911(*b*), 910(*c*) and 911(*c*), and 910(*d*) and 911(*d*). Adjusting for processing delay of interpolation and filtering, RRO AM&BP detector 703 processes a sequence of samples separated T/4 apart: (Y1 Y11 Y12 Y13 Y2 Y21 Y22 Y23 Y3 Y31 Y32 ... Y43 Y5 Y51 Y52 Y53 Y6 Y61 ... ). RRO AM&BP detector 703 processes this sequence to detect peak values (such as the peak values in Table 3) within the F1 and F2 filter output values.

Figure 10:
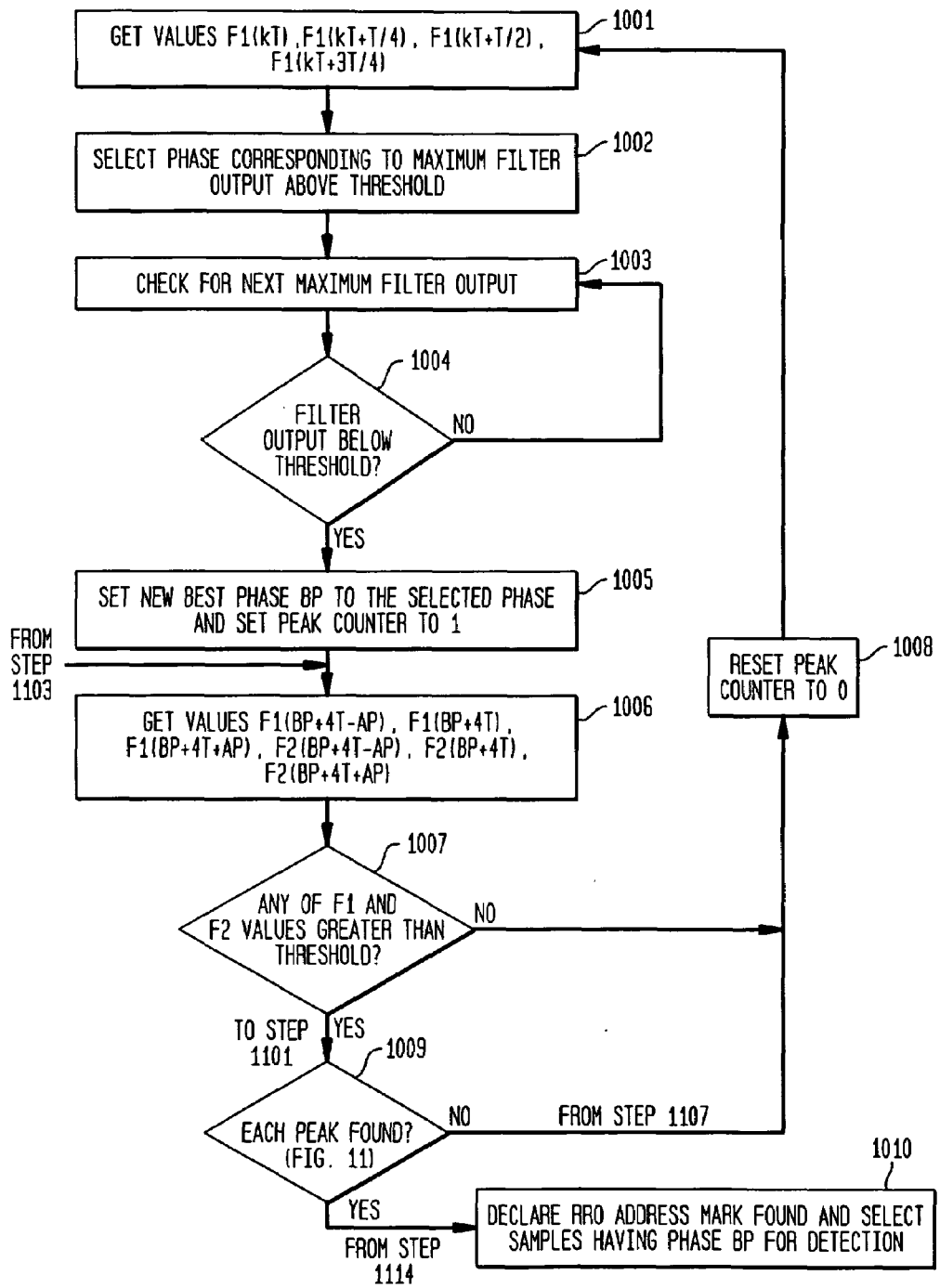
FIG. 10 shows a method of detecting the repeatable run out address mark to determine the best phase (BP)

Address mark detection and best phase selection logic employs these peak values to determine the best phase/best samples. FIG. 10 shows a method of detecting the RRO address mark to determine the best phase. For the method of FIG. 10, the variable BP corresponds to the current best phase for sampling, which is adjusted as each peak is found. At the conclusion of the method of FIG. 10, the value of the variable BP gives the best phase corresponding to the best samples. For each of the compraisons of FIG. 10, the different filter output values of corresponding time instants are compared unless otherwise noted, and for the described embodiment these comparisons are performed sequentially. However, one skilled in the art may extend the teachings herein to different comparisons, such as by parallel processing or cumulative processing of groups of samples.

At step 1001, the values F1(kT), F1(kT+T/4), F1(kT+T/2), and F1(kT+3T/4) are retrieved. For the example of Table 3, a positive peak within the F1 filter output values $F1_a(\bullet)$ ... $F1_d(\bullet)$ appears first. At step 1002, the phase of the samples corresponding to the maximum filter output among F1 values exceeding the threshold value is selected as the current phase for sample examination, and this F1 filter output is noted as a maximum. Thus, at any time T, if any one of the four F1 filter outputs (at different time instants) exceeds a threshold value of 20 (which is a programmable value) for the EPR4 target partial response example of Table 3, the current value for BP is set as the phase corresponding to samples of either i) one of the interpolators or ii) the A/D converter that exceeds the threshold value. At step 1003, for subsequent sample interval Ts, if any of the four F1 filter outputs exceeds the previously noted maximum of step 1002, the new F1 filter output is noted as the maximum and its phase is selected as the current phase BP for sample examination. For the example of Table 3, the first peak value of F1 is a weak peak since the filter output magnitude is about 20, whereas for subsequent peaks the filter output magnitude is about 40.

At step 1004, a test determines whether one of the four F1 filter outputs has dropped below the threshold value. If the test of step 1004 determines that one of the 4 F1 filter outputs has not dropped below the threshold value, the method returns to step 1003 for the next (k+1) samples. If the test of step 1004 determines that one of the four F1 filter outputs has dropped below the threshold value, the method advances to step 1005. At step 1005, the best phase variable BP is set as the time and current phase of the sample corresponding to the maximum F1 filter output, and the variable peak counter is set to 1, indicating that the first peak is found. The value of the best phase variable BP corresponds to the first peak time. The variable peak counter is employed to count the number of peak values found by the method At step 1006, the F1 and F2 filter output values at (BP+4T-AP), (BP+4T), and (BP+4T+AP) are retrieved, where AP is an adjacent phase value. For the described embodiment, the adjacent phase is selected as T/4, but one skilled in the art may employ other adjacent phase values. After locating the first peak, the method searches for peaks using samples at times corresponding to (first peak time (=BP)+4T-T/4), (BP+4T) and (BP+4T+T/4). For example, if the interpolated sample Y12 was the sample having the noted first peak, interpolated samples Y51, Y52, and Y53 are employed. Sample Y52 is 4T apart from Y12. If Y1 was the noted first peak, samples Y43, Y5, and Y51 are employed. As each peak is found, the variable BP is adjusted to find the best phase.

Returning to FIG. 10, at step 1007 a test determines whether any of the F1 and F2 filter output values are greater than the threshold value. If the test of step 1007 determines that no F1 or F2 filter output values are greater than the threshold, the method advances to step 1008. At step 1008, the peak counter is reset to 0, and the method advances to step 1001 to restart the search for the first peak. If the test of step 1007 determines that one or more of the F1 or F2 filter output values at corresponding time instants are greater than the threshold, the method advances to step 1009. At step 1009, a series of tests are employed to detect each peak. If the tests of step 1009 fail to detect one of the peaks, the method advances to step 1008. If the tests of step 1009 detect each peak, the method advances to step 1010. At step 1010, the method declares that the RRO address mark is found, and the final value of BP is selected as the best phase for the samples used in RRO data detection.

FIG. 11 shows a method of testing for each peak in step 1009 of FIG. 10. At step 1101, the F1 and F2 filter output values at (BP+4T-T/4), (BP+4T), and (BP+4T+T/4) are examined to determine whether the maximum F1 filter output value ($F1_{MAX}$) is greater than the maximum F2 filter output value ($F2_{MAX}$) and also greater than the threshold. For these comparisons, the F1 and F2 filter output values at corresponding time instants (e.g., F1(BP+4T-T/4) and F2(BP+4T-T/4)) are examined sequentially. If the test of step 1101 determines that the maximum F1 filter output value is greater than or equal to the maximum F2 filter output value, at step 1102, the maximum F1 filter output value is set as the maximum, its time is set as the current phase BP (the peak time), and peak counter is set to 1. At this point, the second peak of Table 3 is found. At step 1103 the method returns to step 1006 of FIG. 10.

If the test of step 1101 determines that the maximum F2 value is greater than the maximum F1 value, at step 1104, the maximum F2 filter output value is set as the maximum and its time is set as the current phase BP (the peak time) and peak counter is set to 3. At this point, the third peak of Table 3 is found. At step 1105, the new F1 and F2 filter output values are retrieved based on the updated value of BP (i.e., the filter output values at (BP+4T-T/4), (BP+4T), and (BP+4T+T/4)).

At step 1106, a test determines whether the the maximum of the negative F1 output value (i.e., the maximum ~F1 output value) is greater than the maximum F2 output value and also greater than the threshold (In FIG. 11, the "~" indicates the negative of the value). If the test of step 1106 determines that the maximum ~F1 filter output value is not greater than the maximum F2 filter output value at corresponding time instants and/or not greater than the threshold, the method advances to step 1107. Step 1107 returns to step 1008 of FIG. 10 to restart the peak detection process. If the test of step 1106 determines that the maximum ~F1 filter output value is greater than the maximum F2 filter output value and also greater than the threshold, at step 1108 the maximum ~F1 filter output value is set as the maximum, its time is set as the current phase BP (the peak time), and peak counter is set to 4. Thus, locking on to a negative peak in the F1 filter output values corresponds to finding the fourth peak of Table 3. At step 1109, the new F1 and F2 filter output values are retrieved based on the updated value of BP (i.e., the filter output values at (BP+4T−T/4), (BP+4T), and (BP+4T+T/4)).

At step 1110, a test determines whether the maximum ~F2 filter output value is greater than the maximum F1 filter output value and also greater than the threshold. If the test of step 1106 determines that the maximum ~F2 filter output value is not greater than the maximum F1 filter output value and/or not greater than the threshold, the method advances to step 1107. If the test of step 1110 determines that the maximum ~F2 filter output value is greater than the maximum F1 filter output value and also greater than the threshold, at step 1111 the maximum ~F2 filter output value is set as the maximum and its time is set as the current phase BP (the peak time) and peak counter is set to 5. Thus, locking on to a negative peak in the F2 filter output values corresponds to finding the fifth peak of Table 3. At step 1112, the new F1 and F2 filter output values are retrieved based on the updated value of BP (i.e., the filter output values at (BP+4T−T/4), (BP+4T), and (BP+4T+T/4)).

At step 1113, a test determines whether the maximum F2 output is greater than the maximum F1 output and also greater than the threshold. If the test of step 1113 determines that the maximum F2 output is not greater than the maximum F1 output and/or not greater than the threshold, the method advances to step 1107 to return to step 1008 of FIG. 10 to restart the peak detection process. If the test of step 1113 determines that the maximum F2 filter output value is greater than the maximum F1 filter output value and also greater than the threshold, at step 1114 the maximum F2 filter output value is set as the maximum and its time is set as the current phase BP (the peak time) and peak counter is set to 6. Thus, locking on to a positive peak in the F2 filter output values corresponds to finding the sixth and last peak of Table 3.

From step 1114, the method returns to step 1010 of FIG. 10 to declare the RRO address mark found. At this point, the current value of BP corresponds to the best phase for sample selection, and samples having this phase BP are selected as best samples and provided to the RRO data detector 704. While the method of FIG. 11 resets if a peak is missed, alternative embodiments may allow for one or more missed peaks.

Returning to FIG. 7, RRO data detector 704 is employed to decode the RRO data from the sequence of best samples selected as the best phase from RRO AM&BP detector 703. Decoding by RRO data detector 704 depends on the RRO data encoder (not shown in FIG. 7) employed to encode the RRO data. The following describes detection for two exemplary forms of encoding and methods for decoding, though one skilled in the art may readily extend the teachings herein to other encoders based on the constraints of the particular encoder. RRO data detection may generally be asynchronous data detection.

A first exemplary RRO data encoder is a 2/8 encoder which receives two input bits and generates 8 output bits, as shown in Table 4 below. Also shown in Table 4 are corresponding ideal Y values for an EPR4 target partial response for all combinations of input bits.

TABLE 4

| Input bits | Coded bits | Y1 | Y2 | Y3 | Y4 | Y5 | Y6 | Y7 | Y8 |
|---|---|---|---|---|---|---|---|---|---|
| 00 | 00111100 | X | X | X | 20 | 10 | 0 | −10 | −20 |
| 11 | 11000011 | X | X | X | −20 | −10 | 0 | 10 | 20 |
| 01 | 00001111 | X | X | X | 0 | 10 | 20 | 10 | 0 |
| 10 | 11110000 | X | X | X | 0 | −10 | −20 | −10 | 0 |

A 2/8 encoder has a word boundary of 8 bits. Thus, at the end of every 8 bits the following operation is repeated until all the RRO data bits are detected. First, the best samples (i.e., the samples corresponding to the best phase (BP)), Y(BP+n8T+4T), Y(BP+n8T+5T), Y(BP+n8T+6T), Y(BP+n8T+7T), and Y(BP+n8T+8T) are retrieved (n being an integer, n=0, 1, 2, . . . to count every 8T from the best phase (BP) selected during the last peak of the RRO address mark detection). These values are compared to corresponding ideal values such as given in Table 4. The comparison includes computation of corresponding "metrics" that may be defined based on the 2/8 data encoder and its constraints. For example, one such metric may be a computed sum of absolute errors between the best samples and the ideal stream of values. The best metric for this case is the minimum of those computed sums. Codewords corresponding to the best metric are decoded as the RRO data.

A second exemplary RRO data encoder is a 1/4 encoder which receives an input bit and generates 4 output bits as follows: "0" becomes "0011" and "1" becomes "1100". Such a 1/4 encoder is also referred to as a Wide Biphase encoder. For this encoder, at every 4T (i.e., at every word boundary), there is either a positive peak or a negative peak. The value of the peak is ±20 for an EPR4 target partial response. Thus, for this encoder, the data bit may be asynchronously detected as follows. First, the best phase best sample Y(BP+n4T+4T) is retrieved (n being an integer to count every 4T from the best phase (BP) selected during the last peak of the RRO address mark detection). The retrieved sample is compared to a threshold of zero. If the sample is greater than zero, the RRO data bit is declared a "0", else the RRO data bit is declared a "1".

A receiver employing one or more embodiments of the present invention may have substantially improved detection performance for asynchronously sampled servo RRO information. For some exemplary implementations, the receiver may experience approximately 2 dB gain in RRO data error rate and 1 dB gain in RRO address mark miss rate. A receiver using digital interpolators thus replaces higher speed (and higher cost) sampling circuitry that may be employed to over-sample the analog signal.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention my be made by those skilled in the art without departing from the principle and scope of the invention as expressed in the following claims.

What is claimed is:

1. An apparatus for detecting data in samples read from a recording channel, the apparatus comprising:

an interpolator adapted to generate one or more interpolated samples from sets of read samples, wherein each interpolated sample has a corresponding phase relative to one of the associated sets of read samples; and at least one pair of filters, each pair of filters adapted to generate a pair of output values from either i) a read sample or ii) an interpolated sample at a given phase, wherein each pair of filters has a filter response based on a target partial response of the recording channel;

a detector adapted to detect one or more peaks within the filter output values, wherein:
   1) each peak is based on data values of the sample corresponding to one of the filter output values,
   2) as each peak is detected, the detector adjusts a best phase value based on the given phase of the sample corresponding to the one or more peaks, and,
   3) when a predetermined number of peaks are found, the detector provides the adjusted best phase value to select samples from among the read samples and the one or more interpolated samples for data detection.

2. The invention as recited in claim 1, wherein the data is servo data comprising an address mark and an encoded data field.

3. The invention as recited in claim 2, wherein the detector detects the one or more peaks in samples corresponding to the address mark, and wherein the apparatus further comprises:

a decoder adapted to decode the encoded data from the selected samples from the detector.

4. The invention as recited in claim 3, wherein the decoder employs constraints of an encoder employed to generate the encoded data.

5. The invention as recited in claim 4, wherein the encoder is either a 2/8 encoder or a 1/4 encoder.

6. The invention as recited in claim 2, wherein the address mark is a repeatable run out (RRO) address mark and encoded data is encoded RRO data.

7. The invention as recited in claim 2, wherein the read samples are asynchronous samples.

8. The invention as recited in claim 1, wherein the best phase value is a phase of the samples that corresponds to data values having a relatively low probability of error.

9. The invention as recited in claim 1, wherein the apparatus is embodied in an integrated circuit.

10. The invention as recited in claim 1, wherein the apparatus is implemented in a Read channel component.

11. A method of detecting data in samples read from a recording channel comprising the steps of:

(a) generating one or more interpolated samples from sets of read samples, wherein each interpolated sample has a corresponding phase relative to one of the associated sets of read samples; and (b) filtering, with at least one pair of filters, each pair of filters having a filter response based on a target partial response of the recording channel, the sets of read samples and the one or more interpolated samples, wherein each pair of filters generates a pair of output values from either i) a read sample or ii) an interpolated sample at a given phase;

(c) detecting one or more peaks within the filter output values, wherein each peak is based on data values of the sample corresponding to one of the filter output values;

(d) adjusting, as each peak is detected, a best phase value based on the given phase of the sample corresponding to the one or more peaks;

(e) providing, when a predetermined number of peaks are found, the best adjusted phase value;

(f) selecting samples from among the read samples and the one or more interpolated samples based on the provided best adjusted phase value.

12. The invention as recited in claim 11, wherein, for step (a) the read samples corresponding to the data includes servo data comprising an address mark and an encoded data field.

13. The invention as recited in claim 12, wherein step (c) detects the one or more peaks in samples corresponding to the address mark, and wherein the method further comprises the steps of:

(g) decoding the encoded data from the selected samples from the detector.

14. The invention as recited in claim 13, wherein step (g) employs constraints of an encoder used to generate the encoded data.

15. The invention as recited in claim 14, wherein, for step (g), the encoder is either a 2/8 encoder or a 1/4 encoder.

16. The invention as recited in claim 12, wherein the address mark is a repeatable run out (RRO) address mark and encoded data is encoded RRO data.

17. The invention as recited in claim 12, wherein the read samples are asynchronous samples.

18. The invention as recited in claim 1, wherein, for step (d), the best phase value is a phase of the samples that corresponds to data values having a relatively low probability of error.

19. The invention as recited in claim 11, wherein the method is embodied by a processor of an integrated circuit.

20. The invention as recited in claim 11, wherein the method is implemented by a processor in a Read channel component.

21. A computer-readable medium having stored thereon a plurality of instructions, the plurality of instructions including instructions which, when executed by a processor, cause the processor to implement a method for detecting data in samples read from a recording channel, the method comprising the steps of:

(a) generating one or more interpolated samples from sets of read samples, wherein each interpolated sample has a corresponding phase relative to one of the associated sets of read samples; and (b) filtering, with at least one pair of filters, each pair of filters having a filter response based on a target partial response of the recording channel, the sets of read samples and the one or more interpolated samples, wherein each pair of filters generates a pair of output values from either i) a read sample or ii) an interpolated sample at a given phase;

(c) detecting one or more peaks within the filter output values, wherein each peak is based on data values of the sample corresponding to one of the filter output values;

(d) adjusting, as each peak is detected, a best phase value based on the given phase of the sample corresponding to the one or more peaks;

(e) providing, when a predetermined number of peaks are found, the best adjusted phase value (f) selecting samples from among the read samples and the one or more interpolated samples based on the provided best adjusted phase value.

* * * * *